United States Patent
Meng et al.

(10) Patent No.: US 12,421,147 B2
(45) Date of Patent: Sep. 23, 2025

(54) METHOD FOR ENHANCED DENITRIFICATION AND DEVICE THEREOF

(71) Applicant: Sun Yat-sen University, Guangdong (CN)

(72) Inventors: Fangang Meng, Guangdong (CN); Yue Fu, Guangdong (CN); Ronghua Xu, Guangdong (CN)

(73) Assignee: Sun Yat-sen University, Guangzhou (CN)

( * ) Notice: Subject to any disclaimer, the term of this patent is extended or adjusted under 35 U.S.C. 154(b) by 0 days.

(21) Appl. No.: 17/911,131

(22) PCT Filed: Apr. 1, 2022

(86) PCT No.: PCT/CN2022/084844
§ 371 (c)(1),
(2) Date: Sep. 12, 2022

(87) PCT Pub. No.: WO2023/184491
PCT Pub. Date: Oct. 5, 2023

(65) Prior Publication Data
US 2024/0199460 A1    Jun. 20, 2024

(51) Int. Cl.
*C02F 3/30*        (2023.01)
*C02F 101/16*     (2006.01)

(52) U.S. Cl.
CPC .............. *C02F 3/305* (2013.01); *C02F 3/30* (2013.01); *C02F 2101/16* (2013.01); *C02F 2203/006* (2013.01); *Y02W 10/10* (2015.05)

(58) Field of Classification Search
CPC ........ C02F 3/305; C02F 3/30; C02F 2101/16; C02F 2203/006; Y02W 10/10
USPC ....... 210/605, 610, 611, 614, 623, 252, 259, 210/903
See application file for complete search history.

(56) References Cited

FOREIGN PATENT DOCUMENTS

| CN | 202766520 U | * | 3/2013 |
| CN | 206457377 U | * | 9/2017 |

(Continued)

OTHER PUBLICATIONS

Machine-generated English translation of CN 108947100, generated on Jan. 29, 2025.*

(Continued)

*Primary Examiner* — Fred Prince

(57) ABSTRACT

The invention discloses a method for enhanced denitrification and a device thereof. The device comprises an anoxic tank, an aerobic tank and a carbon source booster connected in sequence, and an output end of the carbon source booster is then connected with the anoxic tank; a plurality of membrane contactors are fixed inside the carbon source booster, the membrane contactor is in a hollow structure, and there is a gap between the membrane contactors and a shell of the carbon source booster. By adopting the device, macromolecular carbon source can be added and hydrolyzed into volatile fatty acids by using the hydrolytic fermentation bacteria existing in the gap between the carbon source booster and the membrane contactors, which then penetrates into the hollow part of the membrane contactors through membrane diffusion, as a small molecular carbon source that can be effectively used by denitrifying bacteria to promote the denitrification process.

5 Claims, 5 Drawing Sheets

(56) References Cited

FOREIGN PATENT DOCUMENTS

| CN | 207645901 U | * | 7/2018 | |
|---|---|---|---|---|
| CN | 108947100 A | | 12/2018 | |
| CN | 209957470 U | | 1/2020 | |
| CN | 211896605 U | * | 11/2020 | |
| CN | 113501622 A | * | 10/2021 | |
| CN | 215798704 U | * | 2/2022 | ............ C02F 3/1263 |
| JP | S62171678 A | | 7/1987 | |
| KR | 100419259 B1 | * | 2/2004 | |

OTHER PUBLICATIONS

Machine-generated English translation of CN 209957470, generated on Jan. 29, 2025.*
Machine-generated English translation of KR 100419259, generated on Jan. 29, 2025.*
Machine-generated English translation of abstract of JP 62-171678, generated on Jan. 29, 2025.*
Machine-generated English translation of CN 113501622, generated on Jan. 29, 2025.*
Machine-generated English translation of CN 202766520, generated on Jan. 29, 2025.*
Machine-generated English translation of CN 211896605, generated on Jan. 29, 2025.*
Machine-generated English translation of CN 206457377, generated on Jan. 29, 2025.*
Machine-generated English translation of CN 215798704, generated on Jan. 29, 2025.*
Machine-generated English translation of CN 207645901, generated on Jan. 29, 2025.*

* cited by examiner

METHOD FOR ENHANCED DENITRIFICATION AND DEVICE THEREOF

TECHNICAL FIELD

The invention belongs to the technical field of sewage treatment, and in particular relates to a method for strengthening denitrification and a device thereof.

BACKGROUND

In recent years, the restrictions on sewage standards have become increasingly strict, especially the requirements on total nitrogen discharge. In the past two decades, many new biological denitrification technologies have been developed at home and abroad, such as simultaneous nitrification and denitrification, short-range nitrification and denitrification, anammox, and the like. However, the traditional nitrification and denitrification process is still the most widely used process, which includes the steps of nitrification and denitrification. The removal efficiency of nitrogen in sewage depends to a large extent on the carbon-nitrogen ratio in sewage, and the low-carbon nitrogen ratio is a typical feature of municipal sewage in the country. For example, the average COD of most municipal sewage in South China is about 150 mg/L, which is even lower than 100 mg/L during rainy season, and the influent ammonia nitrogen reaches 20-30 mg/L. For low carbon-nitrogen ratio sewage, additional carbon sources (such as methanol, glucose, sodium acetate, etc.) are usually added to achieve denitrification. However, the continuous addition of carbon sources will increase the cost of chemicals in the sewage treatment plant. Therefore, it is of great engineering significance to optimize carbon source addition and develop low-cost carbon source addition devices and methods.

Most denitrifying bacteria belong to heterotrophic denitrifying bacteria, and they need to utilize organic matter in the process of denitrification. There are many carbon sources that can be utilized in the process of biological denitrification, mainly including slow biodegradable carbon sources, fast biodegradable carbon sources and endogenous carbon sources. In general, rapidly biodegradable carbon sources are the most effective carbon sources, for example, small molecules of acid can be rapidly utilized by denitrifying bacteria. However, the small molecular acid currently used in sewage treatment plants is mainly acetic acid or sodium acetate, which is expensive and has a single component, not conducive to the stability of microbial populations.

Hydrolytic fermentation is divided into hydrolysis and acidification processes. In sludge biological treatment, the hydrolysis refers to the enzymatic hydrolysis reaction of macromolecular organic matter outside the cell, and the complex macromolecular organic matter is decomposed into small molecular organic matter. During the acidification, small organic matter is further converted into volatile fatty acids. Volatile fatty acids are generally organic acids with 1-6 carbon atoms, including acetic acid, propanoic acid, isobutyric acid, valeric acid, isovaleric acid, etc., and are high-quality denitrifying carbon sources. Hydrolytic fermentation bacteria usually exist in the form of free bacteria, and their ability to form biological aggregates is poor. Therefore, in the actual application process, the bacteria are difficult to enrich, easy to lose, and the process needs a long start-up time.

SUMMARY OF THE INVENTION

The object of the present disclosure is to overcome the deficiencies of the above-mentioned prior art and provide a method for enhanced denitrification and a device thereof that can solve the problems of low-carbon nitrogen ratio in the sewage influent, insufficient utilization of external carbon sources and high cost, effectively combining the hydrolytic fermentation of carbon sources and the denitrification process.

In order to achieve the above object, the technical scheme adopted in the present invention is as follows: a device for enhanced denitrification, comprising an anoxic tank 3, an aerobic tank 5 and a carbon source booster 15, which are connected in sequence, then an output end of the carbon source 15 is connected with the anoxic tank 3; a plurality of membrane contactors 101 are fixed inside the carbon source booster 15, the membrane contactor 101 is in a hollow structure, and a gap is formed between the membrane contactors 101 and a shell of the carbon source booster 15.

The device for enhanced denitrification provided by the present disclosure includes a carbon source booster 15, a plurality of membrane contactors 101 with a hollow structure are fixedly provided inside the carbon source booster 15, and there is a gap between the membrane contactors 101 and the shell of the carbon source booster 15. Therefore, in the actual application process, the hollow part of the membrane contactors 101 and the gap provide two channels, and the two channels are separated by the membrane of the membrane contactors 101, so that the contact time and contact area between the sewage and the carbon source can be increased by a reverse flow thereof. The membrane can facilitate a slow-release diffusion and reduce the redox potential, so as to improve the effect of a nitrogen removal by denitrification in subsequent practical applications.

As a preferred embodiment of the device of the present disclosure, a sludge return pump 14 is provided on a pipeline connecting the aerobic tank 5 and the carbon source booster 15.

As a preferred embodiment of the device of the present disclosure, the device further includes a water inlet tank 1, where the water inlet tank 1 is connected with the anoxic tank 3, and a water inlet pump 2 is arranged on a connecting pipeline between the water inlet tank and the anoxic tank.

As a preferred embodiment of the device of the present disclosure, the device further includes an external carbon source tank 18, where the external carbon source tank 18 is connected with the carbon source booster 15, and a peristaltic pump 16 and a time relay 17 are provided on a connecting pipeline between the external carbon source tank and the carbon source booster.

The time relay 17 can control a time gradient in which the peristaltic pump 16 pumps the external carbon source in the external carbon source tank 18 into the carbon source booster 15, so as to control an equivalent concentration of COD of the external carbon source.

As a preferred embodiment of the device of the present disclosure, a stirrer 4 is installed in the anoxic tank 3.

The stirrer 4 is installed in the anoxic tank 3 to ensure that a sludge in the anoxic tank 3 is maintained in a suspended state.

As a preferred embodiment of the device of the present disclosure, the aerobic tank 5 is provided with a membrane module 6, the membrane module 6 is connected with a water outlet pump 11, and an online pressure sensor 10 is arranged on a connecting pipeline between the membrane module and the water outlet pump.

As a preferred embodiment of the device of the present disclosure, a membrane in the membrane module 6 is a flat membrane.

Treated sewage that has passed through the carbon source booster 15 and returned to the aerobic tank 5 is separated from the sludge under a suction action performed on the membrane module 6 by the water outlet pump 11 to obtain a treated water; where, contamination of the membrane module 6 inside the aerobic tank 5 can be characterized by the reading change of the online pressure sensor 10.

As a preferred embodiment of the device of the present disclosure, an aeration head 9 is provided in the aerobic tank 5.

As a preferred embodiment of the device of the present disclosure, the aerobic tank 5 is connected with a high liquid level alarm device 7, a low liquid level alarm device 8, and a gas flow meter 12; the gas flow meter 12 is connected with an air pump 13.

The aerobic tank 5 is connected with the high liquid level alarm device 7 and the low liquid level alarm device 8 respectively. When the liquid level of the aerobic tank 5 is too high during a water intake process, the high liquid level alarm device 7 will be triggered to stop the water inflow. When the liquid level of the aerobic tank 5 is too low during a water discharging process, the low liquid level alarm device 8 will be triggered to stop the water outflow.

In addition, the present disclosure also provides a method for enhanced denitrification, comprising the following steps: pumping a sewage into the anoxic tank 3 inoculated with an activated sludge and then the aerobic tank 5 through the water inlet pump 2, then passing the sewage into the carbon source booster 15 through the sludge return pump 14; returning the sewage from the carbon source booster 15 to the anoxic tank 3 and then the aerobic tank 5, to finally obtain a treated water through the water outlet pump 11; at the same time, adding an external carbon source in the external carbon source tank 18 to the carbon source booster 15 through the peristaltic pump 16 controlled by the time relay 17.

As a preferred embodiment of the method of the present invention, the sewage flow passes through the hollow part of the membrane contactors 101;

In the process of denitrification, the sewage enters the hollow part of the membrane contactors 101 from a bottom inlet of the carbon source booster 15, and returns to the anoxic tank 3 from an upper part of the carbon source booster 15, so that the sewage circulates among the anoxic tank is 3, the aerobic tank 5 and the carbon source booster 15; the gap is filled with an external carbon source, where the external carbon source enters the gap from an injection port on the shell of the carbon source booster 15, and undergoes a hydrolytic fermentation in the gap to produce a large amount of easily usable short-chain fatty acids that are stabilized. Through diffusion, the fatty acids contact with a sludge mixture on the other side of the membrane through the membrane contactor 101, to serve as a carbon source for an iso-oxygen denitrification, thereby producing an effect of enhanced denitrification; at the same time, by adopting the hydrolytic fermentation of the macromolecular carbon sources in the gap, a resulting hydrolysate diffuses to the other side of the membrane in a slow-release manner. In addition to providing denitrifying carbon sources, the membrane contactor can also help reduce the redox potential of the sludge mixture, further promote the denitrification process, and improve the effect of the nitrogen removal via denitrification.

As a preferred embodiment of the method of the present disclosure, the membrane contactor 101 is a permeable membrane tube with a pore size of 0.01-0.5 μm.

As a preferred embodiment of the method of the present disclosure, a MLSS concentration of the activated sludge is 1000-3000 mg/mL, and a dwell time of the activated sludge is 20-40 days.

As a preferred embodiment of the method of the present disclosure, the external carbon source includes any one selected from the group consisting of starch, sugar, and an organic matter.

In the present disclosure, by introducing the carbon source booster 15, an low-price macromolecular carbon source can be added in the process of denitrification, and the hydrolytic fermentation bacteria existing in the gap between the shell of the carbon source booster 15 and the membrane contactors 101 can be used to hydrolyze the macromolecular carbon source into volatile fatty acids, including at least one selected from the group consisting of acetic acid, propanoic acid, isobutyric acid, valeric acid, and isovaleric acid, which then diffuses into the hollow part of the membrane contactor 101 through the membrane, to serve as a small molecule carbon source that bacteria can efficiently use to promote the denitrification process.

As a preferred embodiment of the method of the present disclosure, a hydraulic retention time of the sludge mixture in the carbon source booster 15 is 0.3-1 h.

The hydraulic retention time can directly affect the contact time between the microorganism and the substrate, and the mass transfer process. The preferred hydraulic retention time of the present disclosure is 0.3-1 h. On the one hand, it can ensure sufficient biomass and sufficient time for the denitrification process in the carbon source booster 15, so as to ensure the quality of the treatment water, and on the other hand, it can also avoid the problem of reduced efficiency caused by too long hydraulic retention time.

As a preferred embodiment of the method of the present disclosure, a concentration of dissolved oxygen DO in the aerobic tank 5 is 3.0-5.0 mg/mL, and the hydraulic retention time is 10-15 h.

As a preferred embodiment of the method of the present disclosure, a reflux ratio of the sludge mixture in the method is 100-300%.

As a preferred embodiment of the method of the present disclosure, a COD equivalent concentration of the external carbon source is 40-60 mg/mL.

Compared with the prior art, the beneficial effects of the present invention are:

Firstly, in the technical solution provided by the present invention, by introducing a carbon source booster, a low-price macromolecular carbon source can be introduced in the process of denitrification, and by utilizing hydrolytic fermentation bacteria in the gap between the membrane contactors and the shell of the carbon source booster, the macromolecular carbon source is hydrolyzed into volatile fatty acids, which then penetrate into the hollow part of the membrane contactor through membrane diffusion and acts as a small molecular carbon source that can be efficiently used by denitrifying bacteria to promote the denitrification process;

Secondly, in the technical solution provided by the present invention, the introduced carbon source booster includes membrane contactors, wherein the external carbon source is decomposed into short-chain fatty acids in the gap, while the sludge mixture passes through the hollow part of the membrane contactor and is separated from the external carbon source. Therefore, on the basis of the separation realized by the membrane contactor, the short-chain fatty acids generated by hydrolysis indicate a slow-release characteristic and a capacity of retaining the hydrolytic fermentative bacteria. Therefore, it can avoid ineffective loss of the external carbon source and solve the problems of loss of hydrolytic fermentation bacteria and difficulty in enrichment;

Thirdly, in the technical solution provided by the present invention, by introducing a carbon source booster, the volatile fatty acids and other small molecules can diffuse through the membrane in the carbon source booster, thereby helping to reduce the oxidation-reduction potential of the returned sludge and further enhance the denitrification.

Figure 4:
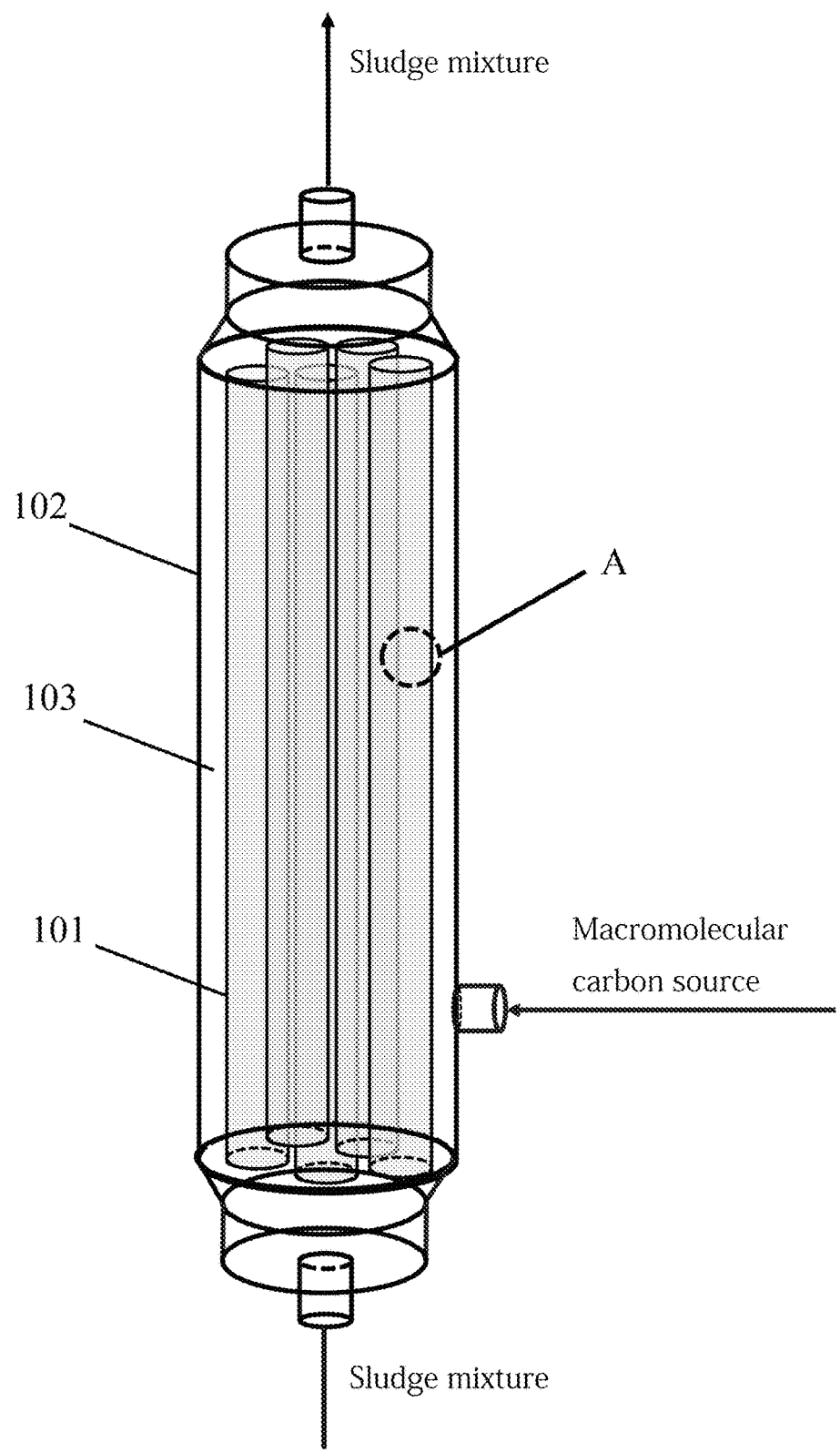
Figure 5:
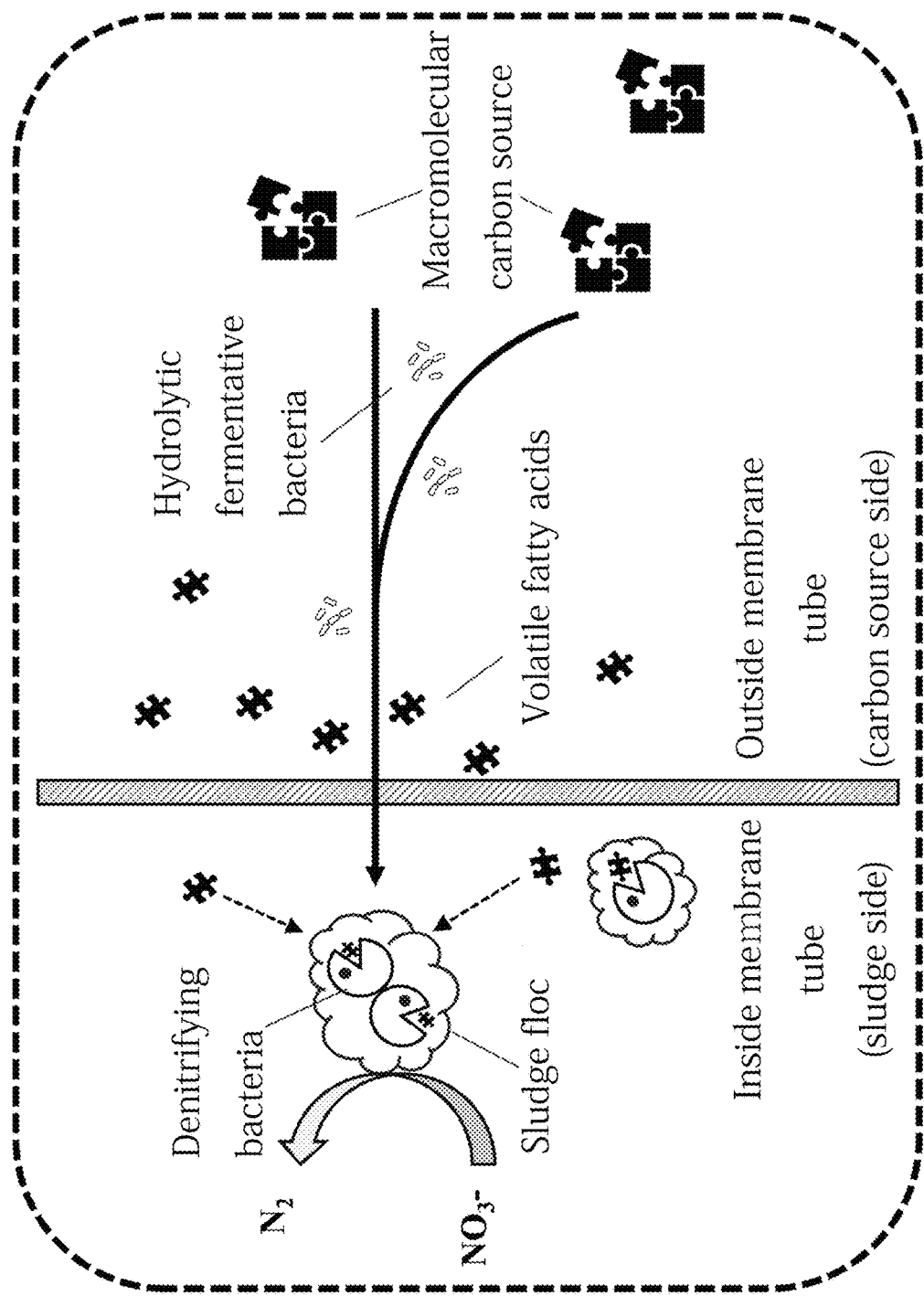

1-water inlet tank, 2-water inlet pump, 3-anoxic tank, 4-stirrer, 5-aerobic tank, 6-membrane module, 7-high liquid level alarm device, 8-low liquid level alarm device, 9-aeration head, 10-online pressure sensor, 11-water outlet pump, 12-gas flow meter, 13-air pump, 14-sludge return pump, 15-carbon source booster, 16-peristaltic pump, 17-time relay, 18-external carbon source tank;

FIG. 4 is the device diagram of the carbon source booster;

101-membrane contactor, 102-shell of the carbon source booster 15, 103-gap between the shell of the carbon source booster 15 and the membrane contactors 101;

FIG. 5 is a schematic diagram of the reaction between the inner and outer sides of the membrane of the membrane contactor 101 in the carbon source booster 15 at the point marked A in FIG. 4.

DETAILED DESCRIPTION OF ILLUSTRATED EXAMPLES

In order to better illustrate the objects, technical solutions and advantages of the present invention, the present invention will be further described below with reference to specific embodiments.

EXAMPLE

Figure 3:
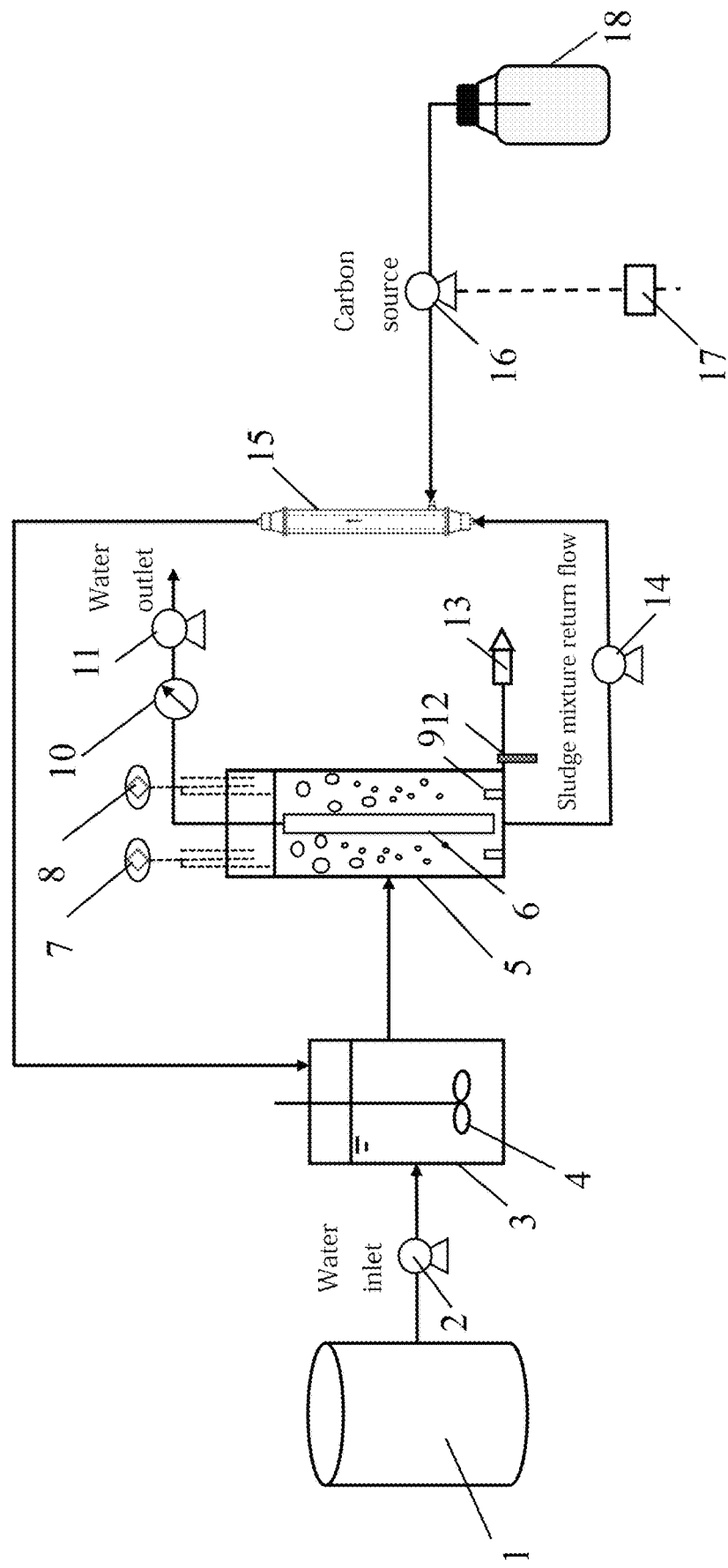
FIG. 3 is the device diagram utilizing carbon source booster to couple anoxic/aerobic MBR.

In the method for enhanced denitrification in this embodiment, the device used is as shown in FIG. 3, including a water inlet tank 1, an anoxic tank 3, an aerobic tank 5, a carbon source booster 15, and an external carbon source tank 18; the described water inlet tank 1 is connected with the anoxic tank 3, the connecting pipeline between them is provided with an water inlet pump 2, the output end of the anoxic tank 3 is connected with the aerobic tank 5, and the lower output end of the aerobic tank 5 is connected with the carbon source booster 15, and a sludge return pump 14 is arranged on the connecting pipeline of the aerobic tank and the carbon source booster; the external carbon source tank 18 is connected with one side of the lower end of the carbon source booster 15, where the connecting pipeline between them is provided with a peristaltic pump 16 and a time relay 17. The upper end of the carbon source booster 15 is connected with the anoxic tank 3 through a connecting pipeline; a stirrer 4 is provided in the anoxic tank 3; a membrane module 6 is provided inside the aerobic tank 5, and a bottom of the aerobic tank 5 is provided with an aeration head 9. One side of the aerobic tank bottom is provided with a gas flow meter 12 and an aeration pump 13, and an upper part of the aerobic tank 5 is connected with a high liquid level alarm device 7 and a low liquid level alarm device 8. The membrane module 6 is connected with a water outlet pump 11 through a connecting pipeline, and an online pressure sensor 10 is arranged on the connecting pipeline; where, the effective volume of the anoxic tank 3 and the aerobic tank 5 are 3 L and 6.57 L respectively; the effective volume of the membrane contactors 101 inside the carbon source booster 15 is 0.96 L, and the gap between the carbon source booster 15 and the membrane contactor 101 has an effective volume of 1.17 L. In addition, the structure of the carbon source booster 15 is shown in FIG. 4, where it is provided with the membrane contactors 101, and has a gap between its shell and the membrane contactors 101.

Among them, the membrane in the membrane module 6 was a flat membrane, the membrane area is 0.1 m², the membrane pore size is 0.1 μm, and the model is SINAP-10, which was purchased from Shanghai SINAP Membrane Tech Co. Ltd.;

The membrane in the membrane contactor 101 was a polyvinylidene fluoride (PVDF) membrane, model HVLP04700, purchased from Millipore China Co., Ltd.

The specific step of using the above-mentioned device for enhanced denitrification includes the following steps:

(1) Start-up Stage

A secondary sedimentation tank sludge from a sewage treatment plant in Guangzhou was inoculated into the device (including the anoxic tank 3 and the aerobic tank 5); the COD of the sewage was 200.41 mg/L, the $NH_4^+$—N content was 33.67 mg/L, TN content was 38.46 mg/L;

(2) Operation Stage

Sewage entered the anoxic tank 3 from the water inlet tank 1 through the water inlet pump 2, a sludge mixture obtained in the anoxic tank 3 entered the aerobic tank 5 under an overflow action, and the stirrer 4 in the anoxic tank 3 was in continuous operation to suspend the sludge. The bottom of the aerobic tank 5 is provided with a sludge return pipeline. The sludge mixture in the aerobic tank 5 flowed to the anoxic tank 3 through the sludge return pump 14, passing through the carbon source booster 15, and the sludge reflux ratio was 100-300%. The external carbon source of fructose syrup was pumped into the carbon source booster 15 through the peristaltic pump 16, and mixed with the returned sludge under a slow-release action. The hydraulic retention time of the returned sludge in the carbon source booster 15 is 0.3-1.0 h. The DO concentration of dissolved oxygen was controlled to be 3.0-5.0 mg/L, and the HRT of the reactor was 10-15 h. The membrane module 6 is placed in the aerobic tank 5, and water was discharged through the suction action of the water outlet pump 11 on the membrane module 6, to achieve the separation of sludge and water. The membrane fouling rate was characterized by the reading change of the online pressure sensor 10. The aerobic tank 5 was provided with a high liquid level alarm device 7 and a low liquid level alarm device 8, respectively. When the liquid level of the aerobic tank 5 was too high during the water inflow process, the high liquid level alarm device 7 was triggered to stop the water inflow. When the liquid level of the aerobic tank 5 was too low during the water discharging process, the low liquid level alarm device 8 was triggered to stop the water outflow. The MLSS concentration range of the activated sludge was controlled to be 2000-3000 mg/L, and the sludge residence time (SRT) range is 20-30 d. The macromolecular carbon source with COD of 10000 mg/L was pumped 20 ml every 4 hours into the carbon source booster 15 by the peristaltic pump 16 that is controlled by the time relay 17, and the COD equivalent concentration of the actual external carbon source is 50 mg/L. Among them, the schematic diagram of the obtainment of the volatile fatty acids through the hydrolytic fermentative bacteria by adding the external carbon source and the denitrification process involving denitrifying bacteria, which took place on both sides of the membrane respectively during the operation, is shown in FIG. 5.

Comparative Example

The only difference between the Comparative Example and the Example is that there is no carbon source booster 15 arranged in the device.

Effect Example 1

This Effect Example detects the types and concentrations of volatile fatty acids in the gap between the shell of the carbon source booster 15 and the membrane contactors 101 in the Example. The specific detection method was as follows: monitoring the concentration of the volatile fatty acids (VFAs) with Gas chromatograph (GC-2014, Shimadzu, Japan) equipped with a flame ionization detector.

Figure 1:
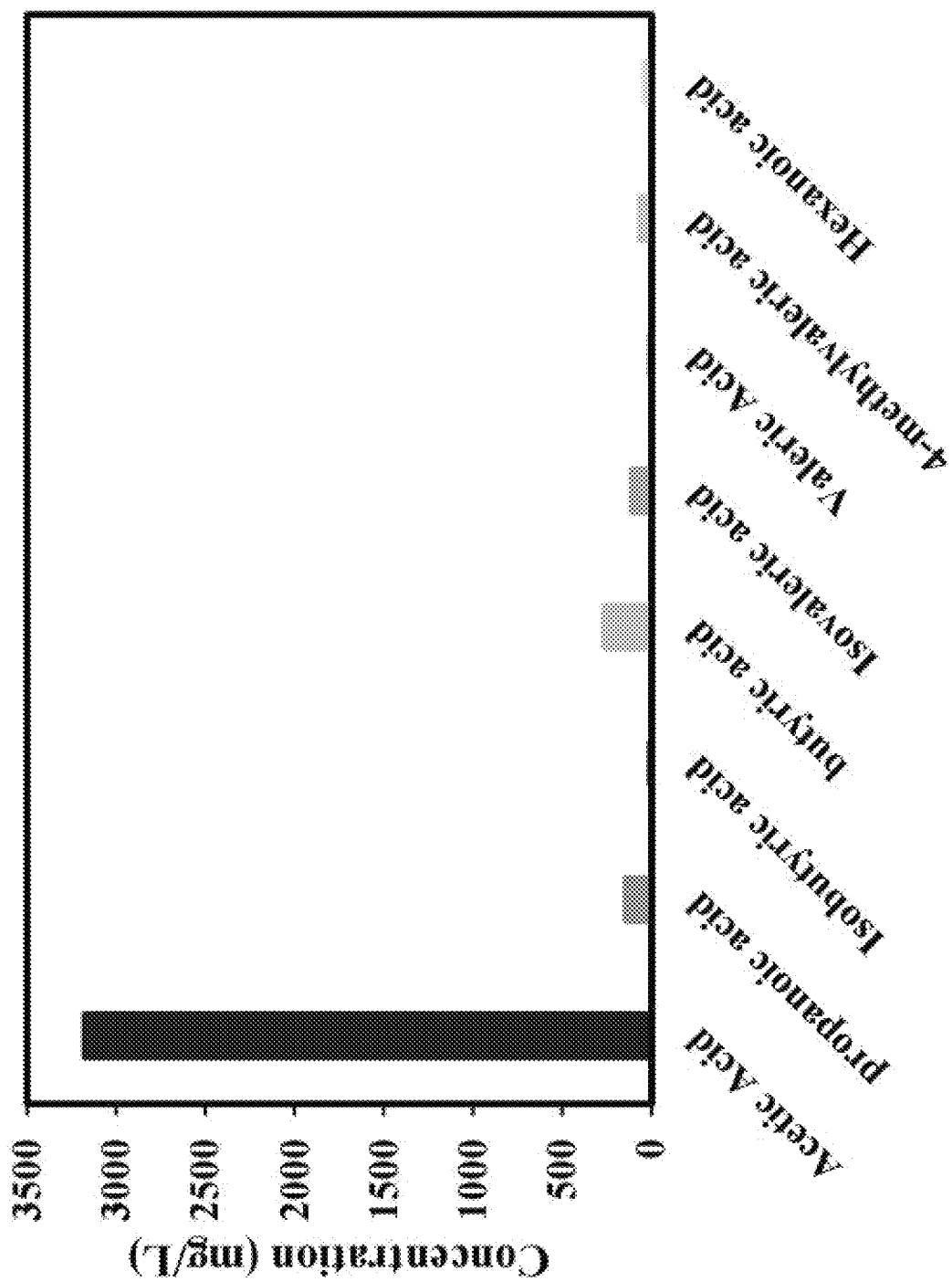
FIG. 1 is a diagram showing the types and concentrations of volatile fatty acids in the gap of the carbon source booster.

The test results are shown in FIG. 1. It can be seen from FIG. 1 that a variety of short-chain novel fatty acids existed in the gap between the shell of the carbon source booster 15 and the membrane contactors 101, and the concentration of acetic acid was 3200 mg/L or more, indicating that the external macromolecular carbon source added in the device provided by the present disclosure produced a large amount of volatile fatty acids through hydrolytic fermentation with hydrolytic fermentative bacteria in the carbon source booster 15, which can provide energy for the denitrifying bacteria inside the membrane contactors 101, and enhance the denitrification.

Effect Example 2

Figure 2:
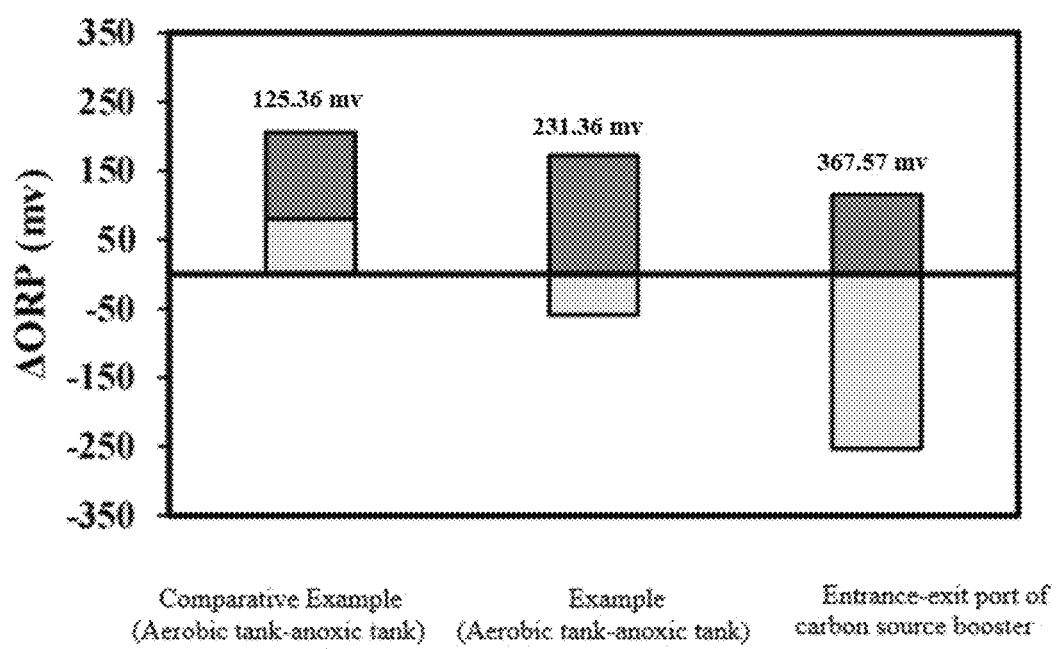
FIG. 2 is the redox potential diagram of the Example and the Comparative Example.

This effect example detects the redox potential of the Example and the Comparative Example. The specific test results are shown in FIG. 2, and the values marked in the figure are the average values; it can be seen from the figure that the carbon source booster 15 can significantly reduce the redox potential of the system. Therefore, it helps to strengthen the denitrification efficiency; the redox potential was measured by Shanghai REX PHS-3E acidity meter.

Effect Example 3

This Effect Example detects the decarbonization, nitrogen and phosphorus removal effect of the Example and the Comparative Example after 100 days of continuous operation. The specific results are shown in Table 1. The methods for the determination of nitrogen, phosphorus and COD referred to the standard methods (APHA, 1998).

TABLE 1 decarbonization, nitrogen and phosphorus removal effect of the Example and the Comparative Example

|  | TN | $NH_4^+$—N | $NO_3^-$—N | COD |
|---|---|---|---|---|
| Example |  |  |  |  |
| Water inflow (mg/L) | 38.46 | 33.67 |  | 200.41 |
| Water outflow (mg/L) | 10.09 | 0.27 | 6.52 | 17.35 |
| Removal rate (%) | 73.76 | 98.94 |  | 91.34 |
| Comparative Example |  |  |  |  |
| Water inflow (mg/L) | 38.46 | 33.67 |  | 200.41 |
| Water outflow (mg/L) | 21.92 | 3.55 | 13.40 | 27.70 |
| Removal rate (%) | 43.01 | 89.47 |  | 86.18 |

It can be seen from Table 1 that after the operation was stable, the average COD concentration in the water outflow of the device was 17.35 mg/L, the average ammonia-nitrogen concentration in the water outflow was 0.27 mg/L, and the average total nitrogen concentration in the water outflow was 10.09 mg/L. The effluent water quality in the Example is obviously better than that in the Comparative Example. Therefore, the carbon source booster coupled with the biological denitrification reactor proposed in the present disclosure shows an efficient and stable decarbonization and denitrification effect on low carbon-nitrogen ratio sewage, and both of the nitrogen content and the COD of the effluent water are lower than the National level A emission standard.

Finally, it should be noted that the above embodiments are intended to illustrate the technical solutions of the present invention rather than limit the protection scope of the present invention. Although the present invention has been described in detail with reference to the preferred embodiments, those of ordinary skill in the art should understand technical solutions of the present invention can be modified or equivalently replaced without departing from its spirit and scope.

The invention claimed is:

1. A device for enhanced denitrification, comprising a water inlet tank, an anoxic tank, an aerobic tank and a carbon source booster, which are connected in sequence, an output end of the carbon source booster is connected with the anoxic tank, a water inlet pump is arranged on a connecting pipeline between the water inlet tank and the anoxic tank, and a sludge return pump is provided on a pipeline connecting the aerobic tank and the carbon source booster;

a plurality of membrane contactors are fixed inside the carbon source booster, each of the plurality of membrane contactors is in a hollow structure, a gap is formed between the plurality of membrane contactors and a shell of the carbon source booster, and a membrane in each of the plurality of membrane contactors is a polyvinylidene fluoride membrane;

the device further comprises an external carbon source tank connected with the carbon source booster, and a peristaltic pump and a time relay are provided on a connecting pipeline between the external carbon source tank and the carbon source booster;

a stirrer is installed in the anoxic tank, a membrane module is arranged inside the aerobic tank and connected with a water outlet pump, an online pressure sensor is arranged on a connecting pipeline between the membrane module and the water outlet pump, and a membrane in the membrane module is a flat membrane with membrane area of 0.1 m² and a membrane pore size of 0.1 μm;

an aeration head is provided in the aerobic tank, the aerobic tank is connected with a high liquid level alarm device, a low liquid level alarm device, and a gas flow meter, and the gas flow meter is connected with an air pump.

2. A method for enhanced denitrification using the device for enhanced denitrification of claim 1, comprising the following steps: pumping a sewage into an anoxic tank inoculated with an activated sludge and then an aerobic tank through a water inlet pump, then passing the sewage into a carbon source booster through a sludge return pump; returning the sewage from the carbon source booster to the anoxic tank and then the aerobic tank, to finally obtain a treated water through a water outlet pump; at the same time, adding an external carbon source in an external carbon source tank to the carbon source booster through a peristaltic pump controlled by a time relay.

3. The method of claim 2, wherein, the sewage passes through a hollow part of each of the plurality of membrane contactors; the external carbon source passes through a gap between the plurality of membrane contactors and a shell of the carbon source booster.

4. The method of claim 2, wherein each of the plurality of membrane contactors is a permeable membrane tube with a pore size of 0.01-0.5 μm.

5. The method of claim 2, wherein a MLSS concentration of the activated sludge is 1000-3000 mg/mL, and a dwell time of the activated sludge is 20-40 days.

* * * * *